(12) United States Patent
Bohnenpoll et al.

(10) Patent No.: US 7,291,758 B2
(45) Date of Patent: Nov. 6, 2007

(54) PROCESS FOR THE PRODUCTION OF HIGHLY REACTIVE POLYISOBUTENES

(75) Inventors: Martin Bohnenpoll, Leverkusen (DE); Jürgen Ismeier, Forstinning (DE); Oskar Nuyken, München (DE); Mario Vierle, München (DE); Dirk Kurt Schön, Wörthsee (DE); Fritz Kühn, Nandlstadt (DE)

(73) Assignee: Basf Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 11/397,104

(22) Filed: Apr. 4, 2006

(65) Prior Publication Data

US 2006/0173227 A1    Aug. 3, 2006

Related U.S. Application Data

(63) Continuation of application No. 10/385,556, filed on Mar. 11, 2003, now abandoned.

(30) Foreign Application Priority Data

Mar. 15, 2002   (DE)   ............... 102 11 418

(51) Int. Cl.
*C07C 2/02* (2006.01)
*C08F 210/00* (2006.01)

(52) U.S. Cl. ............... 585/523; 585/520; 585/525; 585/527; 585/530; 526/348

(58) Field of Classification Search ........... 585/520, 585/525, 523, 527, 530
See application file for complete search history.

(56) References Cited

U.S. PATENT DOCUMENTS

| | | | |
|---|---|---|---|
| 3,024,226 A | 3/1962 | Nolan, Jr. et al. | 260/94.8 |
| 3,166,546 A | 1/1965 | Nolan, Jr. et al. | 260/94.8 |
| 4,152,499 A | 5/1979 | Boerzel et al. | 526/52.4 |
| 4,227,027 A | 10/1980 | Booth et al. | 585/465 |
| 4,605,808 A | 8/1986 | Samson | 585/525 |
| 4,668,838 A | 5/1987 | Briggs | 585/513 |
| 5,340,881 A | 8/1994 | Kennedy et al. | 525/333.7 |
| 5,891,963 A * | 4/1999 | Brookhart et al. | 525/326.1 |
| 6,407,186 B1 | 6/2002 | Rath et al. | 526/69 |

FOREIGN PATENT DOCUMENTS

CA    2334263    12/1999

OTHER PUBLICATIONS

Polyisobutylen und Mischpolymerisate, Springer, Berlin, (month unavailable) 1959, pp. 77-104, H. Güterbock, "Herstellung hochmolekularer Polyisobutylene".
Chem. Eur. J. 4, No. 9, (month unavailable) 1998, pp. 1731-1737, Wayne E. Buschmann and Joel S. Miller, "Sources of Naked Divalent First-Row Metal Ions: Synthesis and Characterization of $[M^{ii}(NCMe)_6]^{2+}$ (M=V, Cr, Mn, Fe, Co, Ni) Salts of Tetrakis[3,5-bis(trifluoromethyl)phenyl]borate".
Tetrahedron Letters, vol. 27, No. 35, (month unavailable) 1986, pp. 4095-4098, Bruce J. Lipshutz, Wayne Vaccaro and Bret Huff, "Protection of Imidazoles as Their β-Trimethylsilylethoxymethyl (SEM) Derivatives".
Journal of the American Chemical Society, 122(3(,(month unavailable) 2000, pp. 9560-9561, Robert E. LaPointe, Gordon R. Roof, Khalil A. Abboud and Jerzy Klosin, "New Family of Weakly jCoordinating Anions".
Ayusman Sen and Ta-Wang Lai: "catalytic polymerization of acetylenes and olefins by tetrakis(acetonitrile)palladium(II) bis(tetrafluoroborate)" Organomatallics, Bd. 1, Nr. 2, 1982, Seiten 415-417, XP002239327 das ganze Dokument.

* cited by examiner

*Primary Examiner*—Glenn Caldarola
*Assistant Examiner*—In Suk Bullock
(74) *Attorney, Agent, or Firm*—Oblon, Spivak, McClelland, Maier & Neustadt, P.C.

(57) ABSTRACT

The present invention relates to a process for the production of highly reactive polyisobutenes with a content of terminal vinylidene groupings of greater than 80 mol % and an average molecular weight of 500 to 10,000 Dalton by cationic polymerization of isobutene or of isobutene and monomers copolymerizable with isobutene in the presence of solvent-stabilized transition metal complexes with weakly coordinated anions.

19 Claims, No Drawings

PROCESS FOR THE PRODUCTION OF HIGHLY REACTIVE POLYISOBUTENES

This application is a Continuation of Ser. No. 10/385,556 filed Mar. 11, 2003, now abandoned.

FIELD OF THE INVENTION

The present invention relates to a process for the production of highly reactive polyisobutenes with a content of terminal vinylidene groupings of greater than 80 mol % and an average molecular weight of 500 to 10,000 Dalton by cationic polymerization of isobutene, in the liquid phase, in the presence of monomeric, solvent-stabilized transition metal complexes with weakly coordinating anions.

BACKGROUND OF THE INVENTION

High molecular weight polyisobutenes with molecular weights up to several 100,000 Dalton have long been known and the production thereof is described, for example, in H. Güterbock: Polyisobutylen und Mischpolymerisate, pages 77 to 104, Springer, Berlin 1959.

Polyisobutenes with molecular weights of 500 to 5,000 Dalton are produced with the assistance of Lewis acid catalysts, such as aluminum chloride, aluminumalkyl chlorides or boron trifluoride and usually have less than 10 mol % of terminal double bonds (vinylidene groupings) and a molecular weight distribution (dispersity) of between 2 and 5.

A distinction is drawn between these conventional polyisobutenes and "highly reactive" polyisobutenes, which have an elevated content of terminal vinylidene groupings of greater than 60 mol %. Highly reactive polyisobutenes have a considerable market share and are used, for example, as an intermediate for the production of additives for lubricants and fuels, as described, for example, in DE-A 27 02 604. These additives are produced by initially producing polyisobutene/maleic anhydride adducts, in particular polyisobutenyl succinic anhydrides, by the reaction of predominantly terminal double bonds of the polyisobutene with maleic anhydride, which are then reacted with certain amines to yield the finished additive. Since it is mainly the terminal vinylidene groupings which react during adduct formation with maleic anhydride, whereas, depending upon their position, the double bonds located further within the macromolecules do not give rise to any or any distinctly lower conversion without the addition of halogens. The proportion of terminal vinylidene groupings in the molecule is an important quality criterion for this type of polyisobutene.

Further quality criteria for polyisobutenes for the stated intended application are the average molecular weight and the molecular weight distribution, also known as dispersity, of the macromolecules contained in the polyisobutene. In general polyisobutenes with average molecular weights (Mn) of 500 to 5,000 Dalton are used as intermediates for the production of the mentioned lubricant and fuel additives.

When isobutene is polymerized, polyisobutene products are obtained, the polyisobutene components of which, i.e. the polyisobutene macromolecules, have a random molecular weight distribution of a greater or lesser width. The wider the molecular weight distribution of these polyisobutenes, the greater the content thereof of polyisobutene macromolecules having relatively low or relatively high molecular weights, which are less suitable for the mentioned intended application.

It is accordingly advantageous to produce highly reactive isobutenes having moderate molecular weights with the narrowest possible molecular weight distribution, in order to reduce the proportion of unwanted, relatively low or high molecular weight polyisobutenes in the resultant product and thus to improve the quality thereof.

According to the teaching of DE-A 27 02 604, reactive polyisobutenes comprising up to 88 wt.% of terminal double bonds can be obtained by boron trifluoride-catalyzed polymerization of isobutene at temperatures of −50 to +30° C. and residence times of less than 10 minutes. A value of no lower than 1.8 is found for the dispersity of the polyisobutenes produced in this manner.

Polyisobutenes with similarly high proportions of terminal double bonds, but with a narrower molecular weight distribution are obtainable if partially deactivated catalysts are used, such as for example complexes prepared from boron trifluoride, alcohols and/or ethers. Processes of this type are described, for example, in EP-A 145 235, U.S. Pat. No. 5,408,418 and WO 99/64482.

While reaction temperatures of above 0° C. are disclosed in the above cited referenced and the Examples, therein only give rise to an elevated content of terminal double bonds of greater than 80% if temperatures of distinctly below 0° C. are used.

It is apparently possible to produce polyisobutenes with a content of up to 95 mol % of terminal double bonds using the gas phase process of U.S. Pat. No. 3,166,546 and the process of U.S. Pat. No. 3,024,226, in which a boron trifluoride/sulfur dioxide gas mixture is used as the catalyst. These polyisobutenes are characterized on the basis of the results of infrared spectroscopy. However, investigation by $^{13}C$ nuclear magnetic resonance spectroscopy ($^{13}C$ NMR spectroscopy) of the polyisobutenes produced according to said processes revealed a content of at most 40 mol % of terminal double bonds.

U.S. Pat. No. 4,227,027 discloses boron trifluoride-catalyzed alkyl transfer reactions, wherein the catalysts are adducts of boron trifluoride and diols or polyols at temperatures of 40 to 120° C. When this process was applied to the polymerization of isobutene using a boron trifluoride/1,2-butanediol adduct as catalyst, the only product to be obtained was diisobutylene. Polyisobutene was not formed.

Another process for the production of highly reactive polyisobutenes involves living cationic polymerization of isobutene with subsequent dehydrochlorination, as is described, for example, in U.S. Pat. No. 5,340,881. This process yields up to 100% of terminal double bonds, but requires low temperatures and a complex solvent mixture, which unnecessarily complicates recycling of the unreacted starting materials.

Accordingly, highly reactive polyisobutenes with an average molecular weight of 500 to 5,000 Dalton and a content of terminal vinylidene groupings of greater than 80 mol % are only obtained if temperatures of below 0° C. are used. Such cooling is associated with considerable costs, which reduce the economic viability of the process.

An object of the present invention was to develop an economic process, which operates at temperatures of above 0° C. and yields the described highly reactive polyisobutenes.

It has now been found that such a process may be achieved if monomeric, solvent-stabilized transition metal complexes with weakly coordinating anions are used as the catalysts.

SUMMARY OF THE INVENTION

The present invention provides a process for the production of highly reactive isobutene homo- and copolymers with a content of terminal vinylidene groupings of greater than 80 mol % and an average molecular weight of 500 to 10,000 Dalton, wherein isobutene or isobutene with copolymerizable monomers is/are polymerize in the presence of a transition metal catalyst of the general formula

[M(R$^1$—CN)$_{4-6}$](A)$_2$, in which

M is a metal from the 3rd to 12th periods of the periodic system of elements,
R$^1$ is a C$_1$-C$_8$ alkyl group and
A is a weakly coordinating anion.

DETAILED DESCRIPTION OF THE INVENTION

Copolymerizable monomers, which may be used in the process of the present invention, include, for example, isoprene and/or styrene. The process according to the present invention is preferably used to produce copolymers based on isobutene and isoprene, which have molecular weights from approximately 2,000 to 7,000 Dalton and have a content of incorporated isoprene of up to 60% (determined by nuclear magnetic resonance spectroscopy).

The highly reactive polyisobutenes produced according to the process of the present invention preferably have a content of terminal vinylidene groupings of 95 to 100 mol % and an average molecular weight of 2,000 to 7,000 Dalton.

The polyisoprenes according to the present invention are soluble in many organic solvents, such as chloroform, dichloromethane, hexane, heptane, cyclohexane, toluene or benzene or mixtures thereof.

The process of the present invention is preferably performed in an inert organic solvent, wherein halogenated and halogen-free hydrocarbons, which may optionally be substituted by nitro groups, or mixtures thereof are used. Dichloromethane, chloroform, dichloroethane, tetrachloroethane, hexane or pentane, and cycloalkanes, such as cyclohexane, and aromatic hydrocarbons, such as toluene and benzene, are, for example, preferred. The quantity of solvent may be determined by routine experimentation. The concentration of the introduced monomers in the solvent used is preferably in the range from 0.01 to 10 mol/l, more preferably 0.1 to 2 mol/l.

Preferably the transition metal catalysts of the above-stated general formula are those in which M is Mn, Ni, Cr or Zn and A contains anions of the formulae BF$_4^-$, SbX$_6^-$, PX$_6^-$ and/or B(Ar)$_4^-$ as well as B(Ar)$_4^-$ anions bridged by cyclic groupings, wherein Ar denotes phenyl, which have 1 to 5 substituents, such as F, Cl or CF$_3$. Cyclic bridges, which may preferably be considered for B (Ar)$_4^-$ anions, include imidazolyl bridges.

In the above general formula, R$^1$ preferably denotes C$_1$-C$_4$ alkyl residues, such as methyl, ethyl, propyl, butyl, isopropyl, isobutyl or tert.-butyl.

More preferred transition metal catalysts include those of the following formulae:

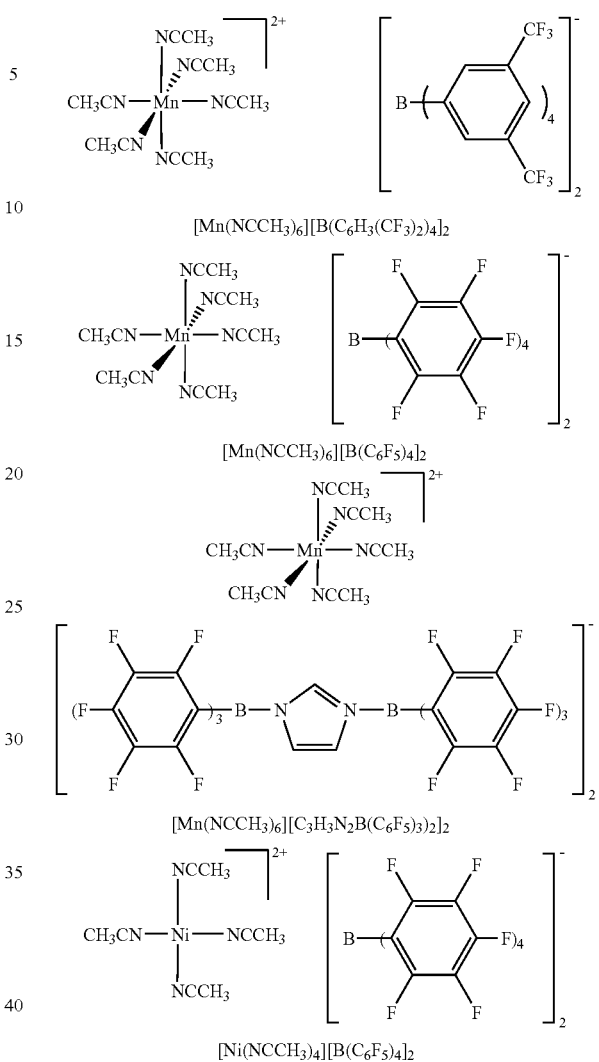

The transition metal catalysts are used in the process according to the present invention in a molar ratio of 1:15,000,000 to 1:10, preferably of 1:500,000 to 1:10,000, relative to the introduced quantities of monomers. The concentration of the introduced catalysts in the reaction mixture is in the range from 0.01 to 10 mmol/l, preferably 0.1 to 2 mmol/l.

Polymerization is performed according to the present invention at temperatures of approximately 0 to 100° C., preferably from 20 to 60° C.

The transition metal catalysts useful according to the present invention are known per se and may be produced using known processes, as described, for example, in Wayne E. Buschmann, Joel S. Miller, Chem. Eur. J. 1998, 4(9), 1731-1737, and Bruce H. Lipshutz, Wayne Vaccaro, Bret Huft, Tetrahedron Letters 1986, 27(35), 4095-4098 and LaPointe, Robert E.; Roof, Gordon R.; Abboud, Khalil A.; Klosin, Jerzy. New Family of Weakly Coordinating Anions. Journal of the American Chemical Society (2000), 122(39), 9560-9561.

The invention is further illustrated but is not intended to be limited by the following examples in which all parts and percentages are by weight unless otherwise specified.

EXAMPLES

Molecular weight Mn was determined by means of gel permeation chromatography in chloroform. Column: Waters Ultrastyragel®, pore size 10,000 and 100,000 Å and Waters Styragel®, pore size 500 Å, detection: differential refractometer (Waters R 401), calibration: polystyrene standards.

Monomers gaseous at room temperature were advantageously dried by using columns packed with phosphorus pentoxide and finely divided potassium on aluminum oxide, while liquid monomers were dried by columns with aluminum oxide and distillation over sodium/aluminum oxide.

Halogenated solvents, such as for example dichloromethane, were dried with calcium hydride and distilled under inert gas.

Aliphatic solvents, such as for example hexane, were dried with sodium and distilled.

The polymers were stabilized by addition of 2,2'-methylene-bis(4-methyl-6-tert-butylphenol) (Vulkanox®BKF, Bayer A G, Leverkusen).

Example 1

12.80 mg of initiator $[Mn(NCCH_3)_6][B(C_6H_3(CF_3)_2)_4]_2$ ($5.0 \cdot 10^{-6}$ mol) were weighed out into a 38 ml autoclave under argon as protective gas and 20 ml of dry dichloromethane were added in a cooling bath at −40° C. 3 ml (1.988 g=0.0355 mol) of freshly condensed isobutene were added to the initiator solution. The isobutene was previously dried with a molecular sieve and potassium on activated carbon. The autoclaves were sealed and polymerization performed for 9 hours at 30° C. The solution remained colorless throughout the entire polymerization. After 9 hours, polymerization was terminated by addition of methanol and the polymer precipitated. A colorless, high viscosity polymer was obtained, which was dried to constant weight under a vacuum (50° C./0.1 mbar). 0.25 g of polymer (16.9% yield) with a molecular weight (Mn) of $9.0*10^3$ Dalton (PDI=1.6) were obtained. The polymer can be stored in air and remains completely soluble.

Example 2

12.43 mg of initiator $[Mn(NCCH_3)_6][C_3H_3N_2(B(C_6F_5)_3)_2]_2$ ($5.0 \cdot 10^{-6}$ mol) were weighed out into a 38 ml autoclave under argon as protective gas and 20 ml of dry dichloromethane were added in a cooling bath at −40° C. 3 ml (1.988 g=0.0355 mol) of freshly condensed isobutene were added to the initiator solution. The isobutene was previously dried with a molecular sieve and potassium on activated carbon. The autoclaves were sealed and polymerization performed for 16 hours at 30° C. and this solution too remained colorless throughout the entire polymerization. After the stated time, polymerization was terminated by addition of methanol and the polymer precipitated. A colorless, high viscosity polymer was obtained, which was dried to constant weight under a vacuum (50° C./0.1 mbar). 0.59 g of polymer (39% yield) were obtained with a molecular weight (Mn) of $6.4*10^3$ Dalton (PDI=1.7). The polymer can be stored in air and remains completely soluble.

The content of terminal vinylidene end groups is 100 mol % according to $^1$H-NMR.

Example 3

24.86 mg of initiator $[Mn(NCCH_3)_6][C_3H_3N_2(B(C_6F_5)_3)_2]_2$ ($1.0 \cdot 10^{-5}$ mol) were weighed out into a 38 ml autoclave under argon as protective gas and 20 ml of dry dichloromethane were added in a cooling bath at −40° C. 3 ml (1.988 g=0.0355 mol) of freshly condensed isobutene were added to the initiator solution. The isobutene was previously dried with a molecular sieve and potassium on activated carbon. The autoclaves were sealed and polymerization performed for 16 hours at 30° C. and this solution too remained colorless throughout the entire polymerization. After the stated time, polymerization was terminated by addition of methanol and the polymer precipitated. A colorless, high viscosity polymer was obtained, which was dried to constant weight under a vacuum (50° C./0.1 mbar). 0.69 g of polymer (45% yield) were obtained with a molecular weight (Mn) of $5.5*10^3$ Dalton (PDI=1.8). The polymer can be stored in air and remains completely soluble.

The content of terminal vinylidene end groups is 100 mol % according to $^1$H-NMR.

Example 4

Isothermal polymerization of isobutene was performed at 40° C. in a polymerization autoclave. The polymerization autoclave was heat treated and flooded with argon before the reaction. 93 mL of dichloromethane were then introduced and adjusted to a temperature of 40° C. As soon as the temperature has reached the desired value, isobutene (p(IB)=2 bar) was added under isothermal conditions until the solution was completely saturated. Saturation proceeds at a stirring speed of 400 revolutions per minute, while polymerization was performed at a stirrer speed of 1,000 revolutions per minute. The reaction began with the addition of 5 mL of a 2 mmolar solution of $[Mn(NCCH_3)_6][B(C_6H_2(CF_3)_3)_4]_2$ (n(I)=10 µmol) in dichloromethane. The initiator solution was injected into the monomer solution with overpressure and the injection system was post-rinsed with 2 mL of dichloromethane $(V(CH_2Cl_2)_{total}=100$ mL). With the assistance of external and internal cooling (manual control), the temperature was held constant during the reaction. Consumed monomer was continuously replenished. After a reaction time of 16 h, no further polymerization occurred. Overpressure in the autoclave was vented while the mixture was slowly stirred and the polymer was then precipitated in an excess of methanol.

Once the solvent evaporated, the polymer was dried to constant weight under a fine vacuum. It proved possible to obtain 67.0 g of polymer having a molar mass (Mn) determined by means of gel permeation chromatography of 2,100 Dalton (PDI=1.2).

The content of terminal vinylidene end groups was 100 mol % according to $^1$H-NMR.

Example 5

12.43 mg portions of initiator $[Mn(NCCH_3)_6][C_3H_3N_2(B(C_6F_5)_3)_2]_2$ ($5.0 \cdot 10^{-6}$ mol) were weighed out into twelve 38 ml autoclaves under argon as protective gas and 20 ml of dry dichloromethane were added to each in a cooling bath at −40° C. The weighed out quantity of isoprene and isobutene was varied. The autoclaves were sealed and polymerization performed for 16 hours at 30° C. in a water bath. Once the polymer had been precipitated with methanol and stabilized with BKF (0.02 g per sample), the polymers were dried to constant weight under a fine vacuum (0.1 mbar/25° C.). Conversion was determined gravimetrically, while molar masses were determined by means of gel permeation chromatography. The quantity of incorporated isoprene was determined by means of nuclear magnetic resonance spectroscopy. The results are listed in Table 1.

TABLE 1

Copolymerization of isobutene/isoprene with Mn complexes

| IB:IP/mol % | Conversion/% | $M_n \cdot 10^{-3}$/ Dalton | mol % IB/IP polymer |
|---|---|---|---|
| 100:0 | 32.9 | 6.4 | 0.0 |
| 98:2 | 6.6 | 5.6 | 1.5 |
| 96:4 | 14.9 | 5.9 | 2.3 |
| 94:6 | 6.2 | 4.8 | 2.3 |
| 92:8 | 19.9 | 4.5 | 3.6 |
| 90:10 | 6.2 | 2.8 | 7.7 |
| 80:20 | 2.3 | 3.3 | 6.0 |
| 70:30 | 1.8 | 2.8 | not determinable |
| 50:50 | 3.0 | 2.9 | not determinable |
| 30:70 | 6.1 | 2.9 | not determinable |
| 0:100 | 0.7 | 2.6 | not determinable |

All the polymers were completely soluble in toluene and colorless, high viscosity liquids.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of highly reactive isobutene homopolymers and copolymers with a content of terminal vinylidene groupings of greater than 80 mol % and an average molecular weight of 500 to 10,000 Dalton, comprising polymerizing an isobutene monomer or an isobutene and a copolymerizable monomer(s) in the presence of a transition metal catalyst of the general formula $[M(R^1\text{-}CN)_{4-6}](A)_2$, wherein M is a metal from the 3rd to 12th periods of the periodic system of elements,
$R^1$ is a $C_1$-$C_8$ alkyl group and
A is a weakly coordinating anion.

2. The process according to claim 1, wherein the polymerization is performed at a temperature from 0 to 100° C.

3. The process according to claim 2, wherein the polymerization is performed at a temperature from 20 to 60° C.

4. The process according to claim 1, wherein the copolymerizable monomer is isoprene, styrene or a mixture thereof.

5. The process according to claim 1, wherein the polymerization is in the presence of an inert organic solvent.

6. The process according to claim 1, wherein the catalyst is introduced in a molar ratio of 1:15,000,000 to 1:10, relative to the total amount of monomer.

7. The process according to claim 1, wherein M is Mn, Ni, Cr or Zn.

8. The process according to claim 1, wherein A comprises anions of the formulae $BF_4^-$, $SbX_6^-$, $PX_6^-$, $B(Ar)_4^-$ or $B(Ar)_4^-$ anions bridged by cyclic groupings wherein Ar is a phenyl with 1 to 5 substituents.

9. The process according to claim 8, wherein the substituent is Fl, Cl of $CF_3$.

10. The process according to claim 1, wherein $R^1$ is a $C_1$-$C_4$ alkyl residue.

11. The process according to claim 1, wherein $R^1$ is methyl, ethyl, propyl, butyl, isobutyl or tert-butyl.

12. The process according to claim 1, wherein said average molecular weight is 2,000 to 7,000 Dalton.

13. The process according to claim 1, wherein said content of terminal vinylidene groupings is 95 to 100 mol %.

14. The process according to claim 5, wherein a concentration of monomers in said solvent is from 0.01 to 10 mol/l.

15. The process according to claim 1, wherein said highly reactive isobutene homopolymers and copolymers have a PDI of from 1.2 to 1.8.

16. The process according to claim 1, wherein said highly reactive isobutene homopolymers and copolymers have a content of incorporated isoprene of up to 60%.

17. The process according to claim 1, wherein a concentration of introduced catalyst in the reaction mixture is in the range of from 0.01 to 10 mmol/l.

18. The process according to claim 1, further comprising:
i) producing a polyisobutene/maleic anhydride adduct; and
ii) reacting said adduct with an amine.

19. The process according to claim 18, wherein an additive for lubricants and/or fuels is produced.

* * * * *